July 19, 1938.   J. J. KOCH   2,123,998
DEVICE FOR ADJUSTING AND LOCKING DAMPERS
Filed July 25, 1936
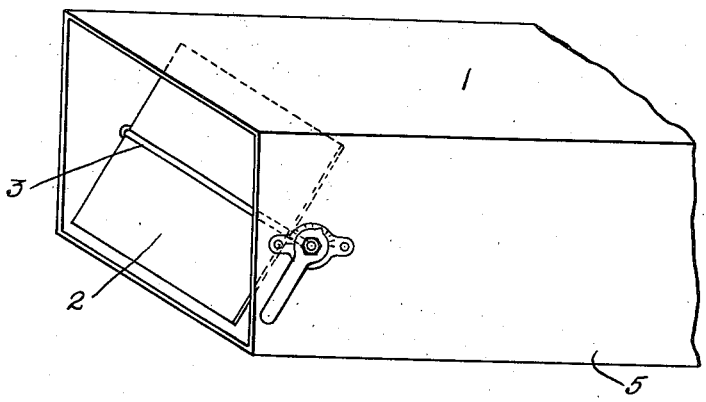
Fig. 1
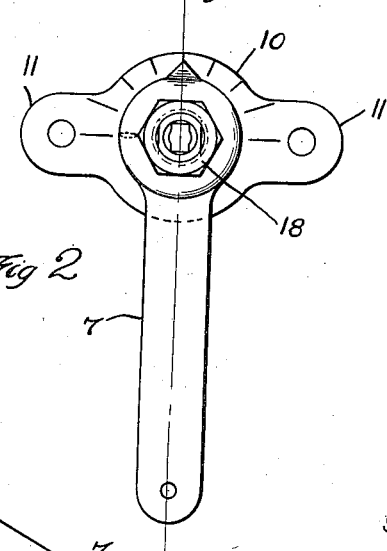
Fig. 2
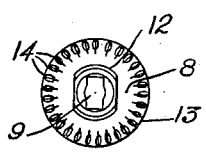
Fig. 7
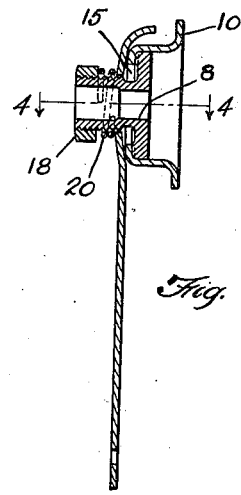
Fig. 3
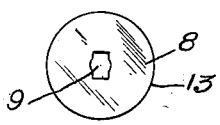
Fig. 6
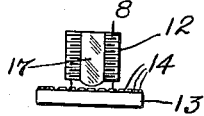
Fig. 5
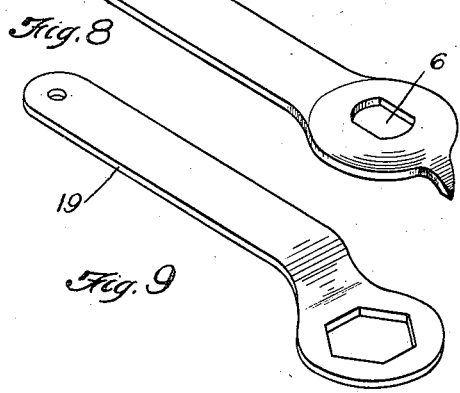
Fig. 8
Fig. 9
Fig. 4
INVENTOR.
BY John J. Koch
Ray, Oberlin & Ray
ATTORNEYS.

Patented July 19, 1938

2,123,998

UNITED STATES PATENT OFFICE 2,123,998

DEVICE FOR ADJUSTING AND LOCKING DAMPERS

John J. Koch, Cleveland, Ohio

Application July 25, 1936, Serial No. 92,589

6 Claims. (Cl. 126—295)

My invention relates to an improved control device for the manipulation of a shaft such as is used for the regulation of other devices through suitable connections. For example, my device may be mounted to cooperate with a shaft bearing rocker arms which through chains raise and lower the draft of a furnace. Another use of my device is in the control of a damper in a flue for regulating the amount of air flowing therethrough. It is for this purpose that the exemplification herein set forth is used. Such damper regulators are useful in a variety of situations, but are particularly important in air conditioning where air from a common source of supply and treatment is transferred through a plurality of air ducts and branches to places of use. For the successful operation of such a system, it is necessary that dampers in the several ducts regulate the distribution of air there-among to meet changing conditions. Also, it is important that the dampers may be locked against tampering by those unauthorized to make adjustments. My device provides means easily installed which means permit ready adjustment of the dampers and provide simple means which are sufficient to protect against casual change of the adjustment.

My improved device permits stepped adjustments from a fully open to a fully closed position of the damper, and provides means whereby the device may be positively locked in any of the said positions. It is air-tight at all times and when unlocked may be readily adjusted by the manipulation of a lever integral therewith.

With the object of providing a device having these and other functions, which will be hereinafter more fully set forth, I have invented a device, one embodiment of which is set forth in the following specification and is illustrated in the accompanying drawing. My said invention consists in the structure described herein and recited in the appended claims.

In the drawing:—

Fig. 1 is a perspective view of an air duct having a damper with a control device mounted on the wall of the duct; Fig. 2 is a perspective view of an unmounted control device; Fig. 3 is a cross-sectional view of a control device taken on the plane indicated by the line 3—3 in Fig. 2; Fig. 4 is a cross-sectional view of a control device taken on the plane indicated by the line 4—4 in Fig. 3; Fig. 5 is a perspective view of the flanged tubular element used as an operative and locking element in my device; Fig. 6 is a bottom view of the element shown in Fig. 5; Fig. 7 is a top view of the element shown in Fig. 5; Fig. 8 is a perspective view of the operating handle of my device; and Fig. 9 is a perspective view of a wrench used in locking my device.

Referring to the drawing, the embodiment of my invention described herein is shown in Fig. 1 in operative position mounted upon the side of an air duct. The damper 2 within said duct is fixedly mounted upon the rod 3 which is pivotally supported between opposite walls of the said duct 1. One end of the rod 3 extends through the side wall 5 of the duct 1 and is shaped to a rectangular cross section with the long axis in the plane defined by the damper. By so shaping the end of the supporting rod 3 and forming the hole 9 in the operating element 8 to fit thereover, the said operative device can only be so mounted as to extend with its handle in the plane defined by the damper, at all times indicating the position of such damper.

It will be understood that a damper mounted otherwise than as shown may be controlled by my device. For such control it is merely necessary that a stub shaft affixed to the damper extend through a wall of the duct for affixing the device thereto. The axis of such stub shaft will be coincident with the axis upon which the damper turns in adjusting same.

Again referring to the drawing, an operating and locking element 8 shown in Figs. 5, 6 and 7 is slipped over the end of the rod 3, which has been shaped as stated whereby the hole 9 in the element 8 non-rotatably engages the said end of the rod 3. It will be understood that the end of the rod 3 and said hole 9 may be made oval or of any other shape. Preferably they will be made irregular to avoid use of a key to lock the element on the rod. Said locking element has a tubular portion 12 externally threaded, and a flange portion 13 at one end. On the surface of the flange 13 which faces the tubular portion 12 of the element 8 are a series of serrations 14 equally spaced about the circumferential margin of such surface.

An assembly, or retaining, cup 10 encompasses the flange portion 13 of the element 8 and is affixed to the wall of the duct by means of the perforated ears 11. On the inner surface of said cup 10, adjacent an aperture 15 in the bottom thereof through which the tubular portion 12 of element 8 extends, is a projection 16, which engages the serrations 14 on the flange portion 13.

The externally threaded tubular portion 12 of element 8 has flattened faces 17 on opposite sides for engagement with the straight sides of an opening 6 in an operating handle 7. The shaped end of the rod 3, the aperture 9 in the element 8, the flat sides 17 of the tubular portion 12, and the straight sides of the aperture 6 in the operating handle 7 are so aligned in assembly that the handle 7 is always located in plane generally defined by the damper 2.

The operating handle 7 is mounted on the threaded tubular portion 12 of the element 8 as explained and is held thereon by a nut 18 by means of which the tension between the element 8 and the assembly cup 10 may be so regulated that the projection 16 will engage the serrations 14 in a locking relation holding the operating handle 7 against adjusting movement until the tension of the device has been relieved by releasing the nut 18 by use of the wrench 19. A coil spring 20, placed about the tubular portion 12 below the nut 18, holds the parts under tension and secures constant engagement between the projection 15 in the inside of the assembly cup 10 and the serrations 14 on the flange 13. The said spring may be mounted between the nut 18 and the operating handle 7, or may be mounted between the said handle and the flange 13 through the aperture 15, or may be mounted between the handle 7 and the assembly cup 10. The spiral spring 20 mounted on the tubular portion 12 of the element 8 in any of the above recited relations will, under the compression of the nut 18 as it is tightened, hold the several parts of my device in adjustable operative relation; and then, under extreme compression, will lock them against further movement, by a non-adjustable engagement of the projection 16 with the serrations 14 on the flange 13 of element 8.

Other modes of applying the principle of my invention may be employed instead of the one explained, change being made as regards the structure herein disclosed, provided the means stated by any of the following claims or the equivalent of such stated means be employed.

I therefore particularly point out and distinctly claim as my invention:—

1. A control device for adjusting and locking a shaft having operative relation with a damper or the like, comprising a terminally-flanged externally threaded tubular member adapted to be non-rotatably mounted on such shaft; an element in co-acting relation with said member said element having means operative to affix it to the wall of a duct containing such damper; engaging formations on said flange and said member permitting step-by-step rotative movement of said member; means effecting rotative movement of said member; a spiral spring mounted about said tubular member; and a nut mounted on said threaded tubular member operative to move said member in adjustable relation with said element, against the tension of said spiral spring.

2. A control device for adjusting and locking a damper, pivotally mounted within a duct and having a shaft fixedly mounted thereon in line with the axis of pivotal movement, said shaft extending outside the duct to a point of control, comprising a mounting element having means operative to affix it on a wall of such duct; a locking element releasably engaging said mounting element in adjustable locking relation and operative to non-rotatably engage said shaft; a nut threadedly mounted on said locking element in such relation to said mounting element that said elements are drawn into locked relation as the said nut is tightened; and an operating handle non-rotatably mounted on said locking element whereby it may be rotated to adjust the position of the damper.

3. A control device for adjusting and locking a damper, pivotally mounted within a duct and having a shaft fixedly mounted thereon in line with the axis of pivotal movement, which shaft extends outside the duct to a point of control, comprising, an externally threaded tubular member adapted to be non-rotatably mounted on such extending shaft end, said member having a radially extended flange mounted on one end thereof; a stop member in engaging relation with said flange and having means operative to affix it on a wall of such a duct; elements on said flange and said stop member interlocking to provide step by step adjustment therebetween on rotation of said tubular member; means whereby said tubular member is rotated; and means whereby said elements on said flange and said stop member may be drawn into locked relation said means comprising a nut mounted on said threaded tubular member.

4. A control device for adjusting and locking a damper, pivotally mounted within a duct and having a shaft fixedly mounted thereon in line with the axis of pivotal movement, which shaft extends outside the duct to a point of control, comprising, a flanged tubular member adapted to be non-rotatably mounted on such extending shaft end, said member consisting of an externally threaded tubular portion and a terminal flange portion having a series of serrations circumferentially placed thereon; an assembly cup, encompassing said flange portion and having an aperture in the bottom through which said tubular portion extends, said cup having means operative to affix it on a wall of such a duct at the desired point of control; a projection mounted on the inner surface of said cup adjacent the aperture therein and in engagement with said serrations; an operating handle non-rotatably mounted on the said tubular portion outside said assembly cup; and a nut threadedly mounted on said tubular portion whereby the said elements are held together under adjustable tension.

5. A control device for adjusting and locking a damper pivotally mounted within a duct, comprising a flanged tubular member adapted to be non-rotatably mounted on a shaft which is mounted in operative relation with such damper, said member consisting of an externally threaded tubular portion with a flattened side longitudinally thereof and a terminal flange portion circumferentially serrated on the surface facing the tubular portion; an assembly cup having means operative to affix it on a wall of such a duct, said cup encompassing said flange portion and having an aperture in the bottom through which said tubular portion extends, and having an inwardly extending projection in engagement with the serrated surface of said flange; an operating handle mounted on said tubular portion in non-rotatable relation therewith; and a nut threadedly mounted on said tubular portion holding the several elements together under adjustable tension.

6. A control device for adjusting and locking a damper, pivotally mounted within a duct and having a shaft mounted therein in line with the axis of pivotal movement, which shaft connects with said device and is controlled thereby, in combination, an element slidably and non-rotatably mounted on said shaft outside said duct; a cup-like mounting member encompassing a portion of said element, said member being fixedly mounted; a handle operatively mounted on said element; and means operative to resiliently draw said element, said member and said handle into close fitting relation.

JOHN J. KOCH.